US012712836B1

(12) United States Patent
Pardo

(10) Patent No.: US 12,712,836 B1
(45) Date of Patent: Aug. 18, 2026

(54) MESSAGING SYSTEM UTILIZING GENERATIVE AI SYSTEM IMAGES

(71) Applicant: Fortix Inc., Maple (CA)

(72) Inventor: Rene Pardo, Maple (CA)

(73) Assignee: FORTIX INC., Maple (CA)

( * ) Notice: Subject to any disclaimer, the term of this patent is extended or adjusted under 35 U.S.C. 154(b) by 0 days.

(21) Appl. No.: 19/084,112

(22) Filed: Mar. 19, 2025

(51) Int. Cl.

| | |
|---|---|
| ***H04L 51/10*** | (2022.01) |
| ***G06F 40/232*** | (2020.01) |
| ***G06F 40/30*** | (2020.01) |
| ***G06T 11/00*** | (2026.01) |

(52) U.S. Cl.
CPC ............ *H04L 51/10* (2013.01); *G06F 40/232* (2020.01); *G06F 40/30* (2020.01); *G06T 11/00* (2013.01)

(58) Field of Classification Search
CPC ....... H04L 51/10; G06F 40/232; G06F 40/30; G06T 11/00
See application file for complete search history.

(56) References Cited

U.S. PATENT DOCUMENTS

| | | | | |
|---|---|---|---|---|
| 11,431,660 | B1 | 8/2022 | Leeds | |
| 2015/0051903 | A1* | 2/2015 | Higashimoto | G06F 40/30 704/9 |
| 2021/0027508 | A1* | 1/2021 | Sharma | G06V 30/414 |
| 2024/0338860 | A1* | 10/2024 | Trzyna | G06F 40/44 |
| 2024/0386058 | A1* | 11/2024 | Thomas | G06F 40/103 |
| 2025/0104313 | A1* | 3/2025 | Salem | H04L 51/04 |
| 2025/0148658 | A1* | 5/2025 | Wan | G06F 40/30 |
| 2025/0348674 | A1* | 11/2025 | Borse | G06N 3/0475 |

FOREIGN PATENT DOCUMENTS

| | | |
|---|---|---|
| CN | 114880441 B | 8/2022 |
| CN | 115861131 A | 3/2023 |

OTHER PUBLICATIONS

Author Unknown. “What is Generative AI?”. Source: https://mailchimp.com/resources/what-is-generative-ai/. Last accessed Mar. 18, 2024.

(Continued)

*Primary Examiner* — Soe Hlaing
(74) *Attorney, Agent, or Firm* — Smart & Biggar LP

(57) ABSTRACT

An artificial intelligence (AI) system for processing and validating editable text, including tracked changes, comments, and version metadata. The system determines whether edits are approved, rejected, or pending and applies AI-driven text verification, fraud detection, and hallucination prevention accordingly. AI validation occurs dynamically to prevent misinterpretation of unapproved changes while ensuring text security and integrity. The invention includes automated fraud detection, cryptographic authentication, and real-time validation to enhance AI-assisted document workflows. The system may integrate with document collaboration platforms, apply blockchain-based verification, and generate validation logs tracking document modifications. AI-driven text formatting correction, security watermarking, and structured validation techniques further improve accuracy and trustworthiness. The system applies across content creation, messaging, legal document processing, and collaborative environments, ensuring AI-generated responses reflect finalized and authenticated content.

20 Claims, 11 Drawing Sheets

(56) References Cited

OTHER PUBLICATIONS

Author: Canva Team. "Canva and HubSpot unpack 3 visual communication trends driving results". Sep. 3, 2024. Source: https://www.canva.com/newsroom/news/hubspot-webinar/. Last accessed Mar. 18, 2024.

Author: Unknown. "Midjourney—Getting Started Guide". Source: https://docs.midjourney.com/hc/en-us/articles/33329261836941-Getting-Started-Guide. Last accessed Mar. 18, 2024.

Barilla, Giorgio. "ChatGPT DALL-E 3: Complete Guide (Generate Images with Text)". Jan. 3, 2024. Source: https://www.akkio.com/post/chatgpt-dall-e-3. Last accessed Mar. 18, 2024.

Wong, Anthony. "Build a Text to Image Service via SMS". Oct. 25, 2022. Source: https://www.twilio.com/en-us/blog/build-text-to-image-service-via-sms. Last accessed Mar. 18, 2024.

* cited by examiner

MESSAGING SYSTEM UTILIZING GENERATIVE AI SYSTEM IMAGES

TECHNICAL FIELD

Example embodiments relate to an artificial intelligence (AI) system for generating conversational images in real time to be used in communication with another user.

BACKGROUND

Text messaging has long been the predominant method of digital communication, allowing users to exchange information, emotions, and ideas. While emojis and pre-made stickers offer visual elements that complement text, these are limited to predefined graphics that do not capture the full spectrum of personal expression or contextual nuance in conversations. Currently, artificial intelligence (AI) systems can generate images based on text descriptions, but there is no established application where users can dynamically replace their entire text communication with unique, context-driven images generated in real-time based on the user's messages. The lack of a system that enables users to express themselves through dynamically created images in place of text limits the depth and engagement of digital interactions.

Further, when AI systems generate text, they often rely on visual pattern recognition rather than traditional text encoding. As a result, these images often result in errors in how letters are formed or displayed. As the text is not traditionally encoded, there is also limited control by users over fonts used in the generated image, or other commonly available text options. AI-generated images also often contain unreadable, overlapping, or misaligned text due to the lack of a dedicated text formatting validation step. A significant challenge in AI-generated images containing text is ensuring the accuracy, reliability, and security of the embedded text. Current generative AI models may introduce distortions, errors, or inconsistent formatting, which can impact the clarity of communication. Furthermore, there are increasing concerns about the potential for misuse of AI-generated text-based images in deceptive messaging or fraudulent activities. Additionally, conventional AI systems lack robust mechanisms for verifying the authenticity of AI-generated images, which raises concerns about the potential for misrepresentation, manipulation, and trustworthiness in digital communications.

AI systems are additionally being increasingly relied upon to assist in text validation, summarization, and fraud detection. AI systems can generate text-based insights, identify inconsistencies, and process user-edited content. However, when working with documents containing tracked changes, comments, or version history metadata, existing AI systems lack the ability to distinguish between approved, rejected, and pending modifications. Treating all textual input as finalized content can lead to critical errors in validation, hallucination correction, and fraud detection, such as processing unapproved edits as finalized content, applying fraud detection and hallucination prevention to incomplete drafts, and generating summaries or insights based on unapproved modifications.

There is thus a need in the art for a modified AI system which can dynamically generate images including text in real time based on conversational cues or messages. There is a need for enhanced verification techniques, fraud detection capabilities, and security measures to ensure that AI-generated images containing text maintain accuracy, authenticity, and integrity. There is further a need in the art for enhanced text rendering in AI-generated images, allowing for more accurate generation and display of text, as well as more options for customization and change of text. There is further a need in the art for an AI system capable of analyzing editable document states, recognizing tracked changes, comments, and version control metadata, and applying AI-based validation only to the approved portions of a document. This modified AI system may be integrated within a messaging application. This modified AI system should build off of pre-existing generic generative AI systems, such as generic diffusion models. This modified AI system may also be integrated into a document collaboration platform.

SUMMARY

A system and method for AI-assisted document processing and validation, incorporating automated fraud detection, cryptographic security, tracked change verification, and adaptive AI-driven text validation techniques. The system receives a document containing tracked changes, comments, or version metadata, extracts the relevant modifications, and applies AI-driven validation, fraud detection, and hallucination correction based on approval status. The system determines whether edits are approved, rejected, or pending, modifying processing accordingly to prevent AI misinterpretation of unapproved changes. The invention includes automated AI-based formatting correction, security watermarking, and structured validation techniques, ensuring accuracy and trustworthiness in AI-assisted document workflows. The system may integrate with document collaboration platforms, utilize cryptographic authentication and blockchain-based verification, and generate validation logs tracking document modifications. The system dynamically applies context-aware processing to adjust AI validation based on document state, preventing AI from making incorrect inferences on evolving content.

An example embodiment is a method for communication, the method comprising receiving, by a processor, one or more first manual inputs into a generative Artificial Intelligence (GenAI) model from a messaging application; analyzing, by the GenAI model, the one or more first manual inputs to determine if the one or more first manual inputs contain information that can be accurately conveyed using an image; on a determination that the one or more first manual inputs contain information that can be accurately conveyed using an image, generating an image that conveys the information; and outputting the image to the messaging application.

Another example embodiment is a system for fraud detection in artificial intelligence (AI)-generated images, comprising a messaging application stored on a first electronic device; a server containing a Generative AI model, the server configured to receive manual text inputs, analyze input text for fraud markers before image generation, generate an image while applying pre-generation fraud detection, validate the text content within the generated image using a secondary AI model, compare generated text against phishing and scam databases, and flag, correct, or reject AI-generated images containing misleading, deceptive, or unauthorized text patterns.

Another example embodiment is a system for secure artificial intelligence (AI) image messaging, comprising a cryptographic watermarking module embedding security metadata within AI-generated images; a blockchain-based logging system to store AI generation history and prevent unauthorized modifications; an adaptive text-rendering AI for correcting distortions, hallucinations, and inconsistencies in AI-generated text images; and a communication module for securely transmitting validated AI-generated images to intended recipients.

Another example embodiment is a system for ensuring artificial intelligence (AI)-generated image integrity, comprising a primary Generative AI model for text-based image creation; a secondary AI validator that cross-checks AI-generated text against its original input to detect hallucinations; and a cryptographic authentication layer to prevent deepfake misuse of AI-generated text images.

Another example embodiment is a method for generating an artificial intelligence (AI)-generated image with dynamically adjusted text, the method comprising receiving a user input comprising a text prompt for image generation; generating an image using an AI model, wherein the image includes text derived from the user input; dynamically modifying text positioning before finalizing the image to optimize readability; and outputting the finalized AI-generated image.

Another example embodiment is a system for processing editable text in an artificial intelligence (AI)-assisted document processing system, the system comprising a document input module, configured to receive an input document containing tracked changes, comments, or version metadata; a change verification module, configured to extract tracked changes, comments, and version metadata from the input document and identify whether each tracked change is approved, rejected, or pending; an AI validation module, configured to analyze the document text and apply AI-driven validation, fraud detection, and hallucination correction based on approval status; and an output module, configured to generate and output a validated document or AI-generated response based on the processing results.

Another example embodiment is a method for processing editable text in an artificial intelligence (AI)-assisted document system, the method comprising receiving, by a processor, an input document containing tracked changes, comments, or version metadata; extracting, by the processor, tracked changes, comments, and version metadata from the input document; identifying, by the processor, whether each tracked change is approved, rejected, or pending; determining, by the processor, whether pending edits exist; if pending edits are detected, modifying processing based on approval status; if no pending edits are detected, applying AI-driven validation, fraud detection, and hallucination correction; and generating and outputting a processed document or AI-generated response.

Another example embodiment is a system for automating AI-generated image corrections, the system comprising a processing module, configured to analyze AI-generated images containing text; a validation module, configured to identify and correct text positioning errors, formatting inconsistencies, and hallucinations that would otherwise require manual intervention; an automation module, configured to dynamically replace manual adjustments by automatically applying AI-driven corrections to improve text alignment, readability, and integrity; and a decision module, configured to verify whether a correction is required and implement necessary adjustments in real-time before finalizing the AI-generated image or output.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

A person skilled in the art will appreciate that the embodiments described herein are merely illustrative of possible implementations of the system and method. Various modifications, adaptations, and alternative configurations may be made without departing from the spirit and scope of the invention. The described techniques and processes can be applied to different types of generative AI models, security verification systems, and messaging frameworks as technology evolves. Furthermore, while specific implementations may include blockchain-based security logging, cryptographic watermarking, and AI-driven fraud detection, equivalent or alternative methods may be substituted to achieve similar objectives. Accordingly, the invention is not limited to the specific embodiments disclosed but encompasses all variations that fall within the scope of the appended claims.

Figure 1:
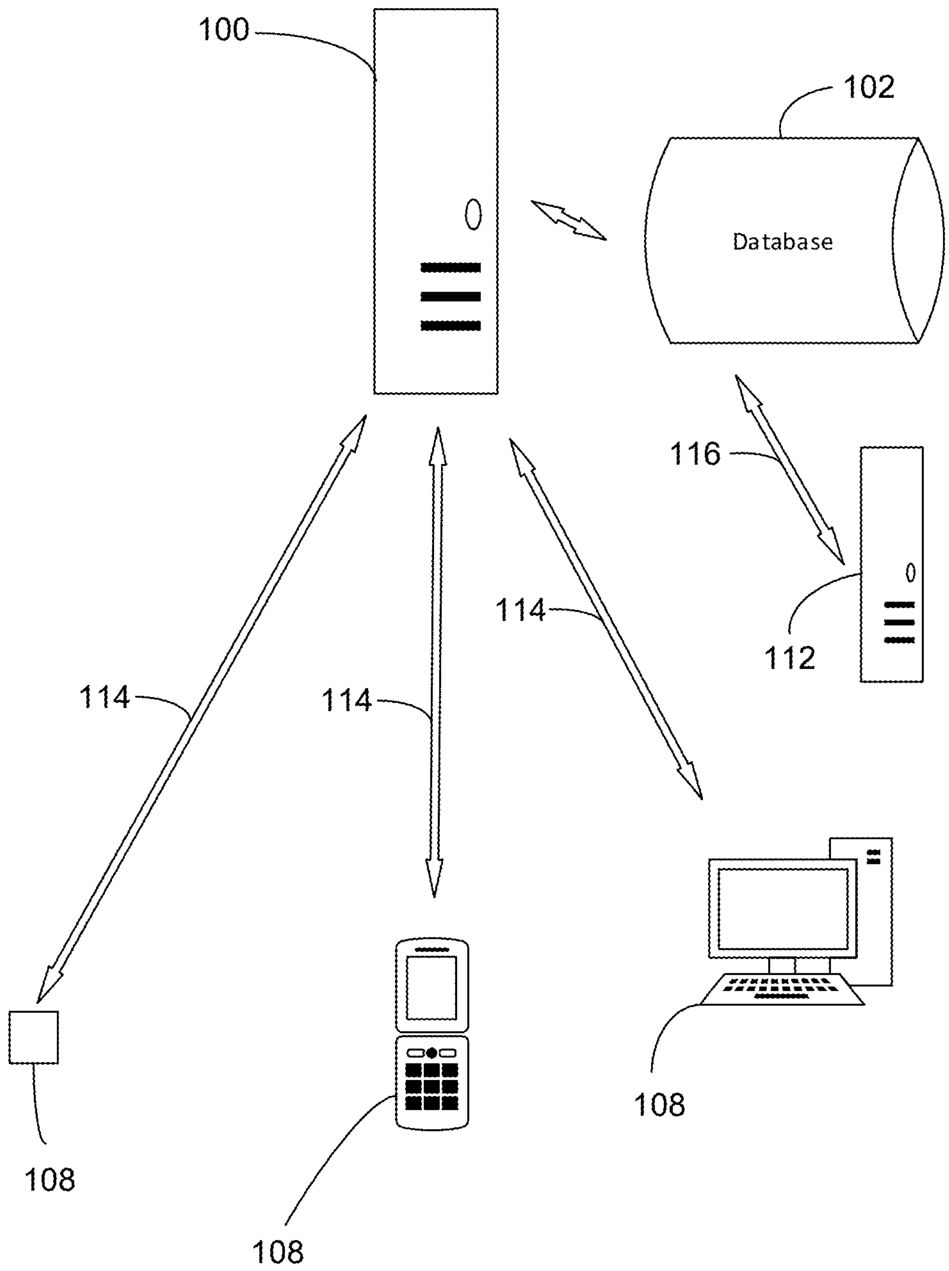
FIG. 1 is a schematic diagram of a modified generic generative artificial intelligence (AI) diffusion model, according to an example embodiment.

FIG. 1 illustrates a system 10 for interaction with an Artificial Intelligence (AI) system, in accordance with an example embodiment. In an embodiment, the AI system is a generative AI system. In an embodiment, the AI system is a generic generative AI system. In an embodiment, the AI system is a modified generic generative AI system. In an embodiment, the modified generic generative AI system uses a diffusion model. The system 10 may be for use alongside any number of messaging applications, present on any number of electronic devices 108. Although interactions between two users are described herein, a person of skill in the art recognizes that the modified generic generative AI system may interface with any type or number of messaging applications, and communications can be sent through the modified generic generative AI system through any number of messaging applications at once or successively.

The system 10 can include a diffusion model server 100, an external database 102, and one or more electronic devices 108. The diffusion model server 100 may be a cloud platform, which can offer scalable resources that are required to process large amounts of data. Additionally, a cloud server allows the data stored in the database 102 as well as inputs and outputs of the diffusion model server 100 to be accessed and stored in various locations globally. Alternatively, the diffusion model server 100 may be a physical server hosted in a physical location.

In an embodiment, the diffusion model server 100 interacts with the database 102 in order to create personalized environment for a profile of a user of a messaging application, whereby a user's preferences, interaction history, and information are stored in the database 102. The profile of the user may be a registered profile, such as an account, where the user can create a personalized account with all of their information. The registered profile may belong to any entity, such as an individual, a corporation, a business, or an organization. In an embodiment, the profile of the user may be an unregistered profile, whereby the user does not create an account, but certain identifying information about the user is stored in the database 102 to differentiate them from other users. In an embodiment, the database 102 can receive information directly from a remote server 112, for example, from information available on the internet. The database 102 can communicate with the remove server 112 through various means, such as via a communication link 116, to receive any information necessary.

As will be discussed in greater detail in FIG. 3, the diffusion model server 100 is configured to receive input from messaging applications through the electronic devices 108. In an embodiment, the input from the messaging application may be a text input that may be determined to be a question, command, message, or instruction. The diffusion model server 100 is also configured to output responses to the question, command, message, or instruction, via the electronic devices 108. The electronic device 108 can include a microphone for receiving voice inputs into the messaging application. The electronic device 108 may also include a screen or touchscreen allowing a user to interact with a messaging application. The electronic device 108 may also include a keyboard for receiving text inputs and a display screen for communicating the outputs of the diffusion model server 100. The electronic device 108 can be a desktop, a laptop, or a mobile communication device, such as a smart phone or a tablet. The electronic device 108 can be a stationary IoT device having a microphone. The electronic devices 108 can be connected to the diffusion model server 100 via a communication link 114.

Figure 2:
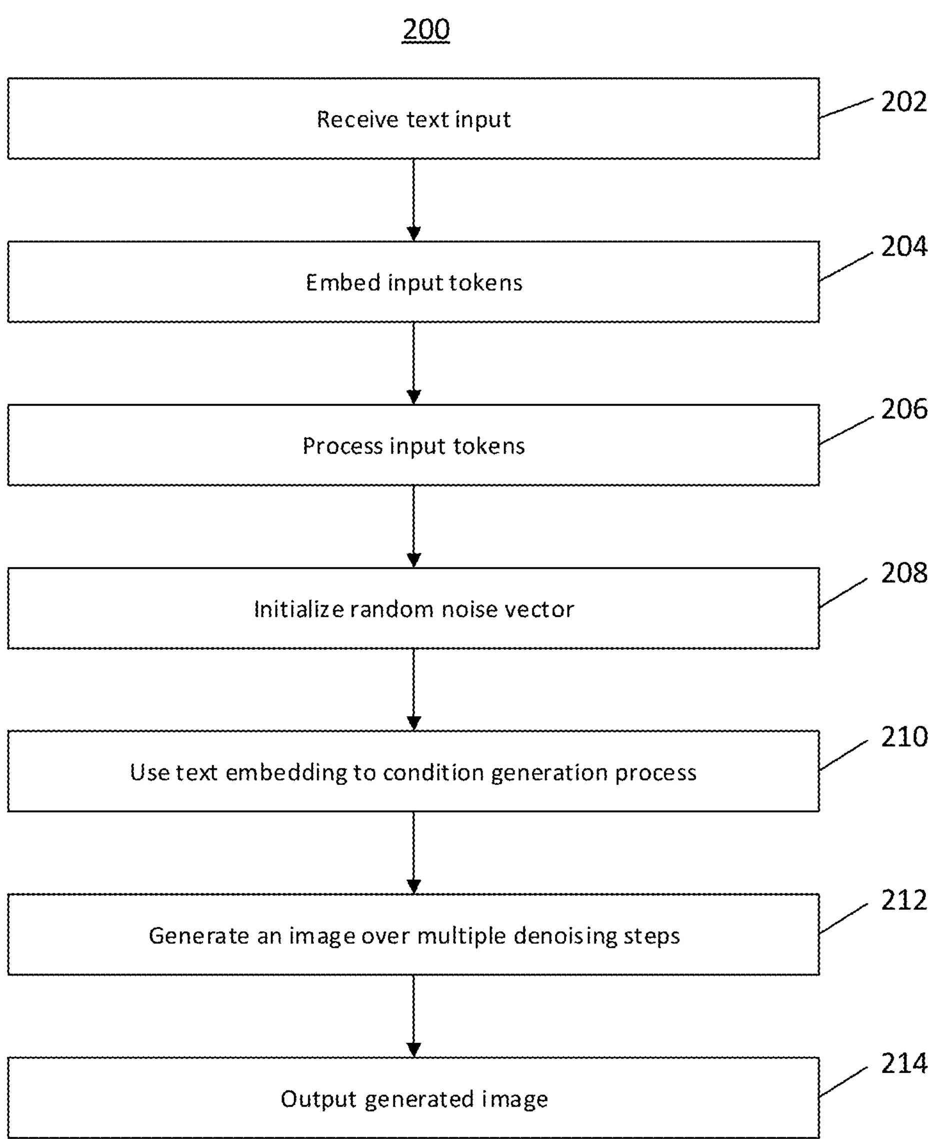
FIG. 2 is a flowchart illustrating an example method for processing text input and generating image output using the modified generic generative AI diffusion model of FIG. 1.

FIG. 2 is a flow chart illustrating a general method 200 through which the modified generic AI diffusion model processes inputs from a messaging application and creates outputs directly to the messaging application. The modified generic AI diffusion model may use a generic generative AI system, such as DALL-E 2, Stable Diffusion, MidJourney, Runway ML, or any other generic generative AI system that is trained on a large, unspecific data set. The generic generative AI system may be modified to have an internal database to store information, or may be modified to access external databases.

In method 200, at step 202 the diffusion model server 100 receives input in the form of text input. The diffusion model may receive this input through a messaging application via electronic device 108. Prior to receiving the input, the diffusion model may be trained using supervised or unsupervised learning on large amounts of image data. During training, for each clean image, the forward diffusion process is simulated by adding noise to the images over multiple steps.

The forward diffusion process can be modeled as:

$$x_t = \sqrt{1-\beta_t} \cdot x_{t-1} + \sqrt{\beta_t} \cdot \epsilon_t$$

where $x_t$ represents the image x, at a time step t, $\beta_t$ is a schedule controlling the amount of noise added at each step, and $\epsilon_t$ is a gaussian noise added at a time step t. $\beta_t$ typically increases over time, and over multiple steps, the image becomes corrupted until it is pure noise.

The diffusion model may learn the reverse diffusion process during training, whereby the model is tasked to predict the noise that was added at time step t, allowing the model to denoise the image and recover the original data.

The reverse diffusion process can be modeled as:

$$p(x_{t-1}|x_t)=N(x_{t-1};\mu_t(x_t),\Sigma_t)$$

where $\mu_t(x_t)$ is the mean of the predicted distribution for $x_{t-1}$, $\Sigma_t$ is the covariance of the distribution, and $N(x_{t-1}; \mu_t(x_t), \Sigma_t)$ represents a gaussian distribution. Once the diffusion model is trained to predict the noise at each time step t, it can use the learned reverse process to generate images.

The diffusion model may receive input by any method or electronic device 108 as discussed previously. Once the diffusion model has received the text input, each word, subword, or character may be broken into tokens which can be more efficiently processed by the model.

At step 204, the diffusion model converts the input tokens into embeddings. Each token is mapped to a vector in a high-dimensional space. The embeddings are learned during the training process of the diffusion model, and may represent the semantic meaning of each token, including various aspects of meanings, such as synonyms and relationships between words. Positional encoding may also be added to the token embeddings to provide information relating to the position of each input token in the sequence. These positional encodings may be learned encodings or fixed encodings.

At step 206, the input tokens are processed by the diffusion model. The processing may be done by means of a transformer architecture. The transformer architecture may consist of an encoder. The encoder works to process the input sequence by capturing relationships between words in the input. This may be done with or without regard to the position of the words in the sequence. By way of a self-attention mechanism, each input token is processed in parallel, and the self-attention mechanism allows the diffusion model to focus on each different token in an input sequence, and how it relates to other words in the input sequence. The model may calculate a self-attention score for each token through the equation:

$$\text{Attention}(Q, K, V) = \text{softmax}\left(\frac{QK^T}{\sqrt{d_k}}\right)V$$

where Q represents the query matrix, K represents the key matric, V represents the value matrix, and dk is the dimension of the key vectors. The outcome of this equation is a weighted sum of values for each token.

After the self-attention step, the representation of each token is passed through a neural network to further process the information. In an embodiment, this may be a feed-forward neural network. The encoder may be composed of multiple layers of self-attention and feed-forward neural networks, allowing the model to process increasingly complex relationships between words in the input sequence.

At this stage, the modified generic generative AI system may communicate with database 102 to gain additional information related to previous conversations or stored profiles in order to contextualize the input from the messaging application. For example, a common word may have been previously defined to have a different meaning than typically known, or meaning may have been assigned to a new or created word. A generic generative AI system would not have the relevant context to process this type of information properly, unless the information was given within the same communication session. However, the modified generic generative AI system may have access to a profile or a communication history with a messaging application, and can therefore draw on the stored information to understand the full scope of context for a word.

At step 208, the diffusion model initializes a random noise vector, which represents an unstructured image. Once the diffusion model has the vector representation of the input text, the information can be sent to the diffusion model to condition the generation process at step 210. The conditioning is done by feeding the text input (the text embedding) into the diffusion model at various stages during the denoising process. Commonly done in a U-Net architecture, the text embedding is passed through cross-attention layers, which allow the model to focus on the relevant parts of the text at different stages of the image generation process. The diffusion model may use latent space conditioning, to first generate the image in a lower-dimensional latent space, and then use the text embedding to guide the generation of the final image within the latent space.

At step 212, the image is generated over multiple denoising steps, and transforms from random noise to a structured image, which is output to the electronic device 108 at step 214. The result is an output of a generated image that matches the input prompt.

Figure 3:
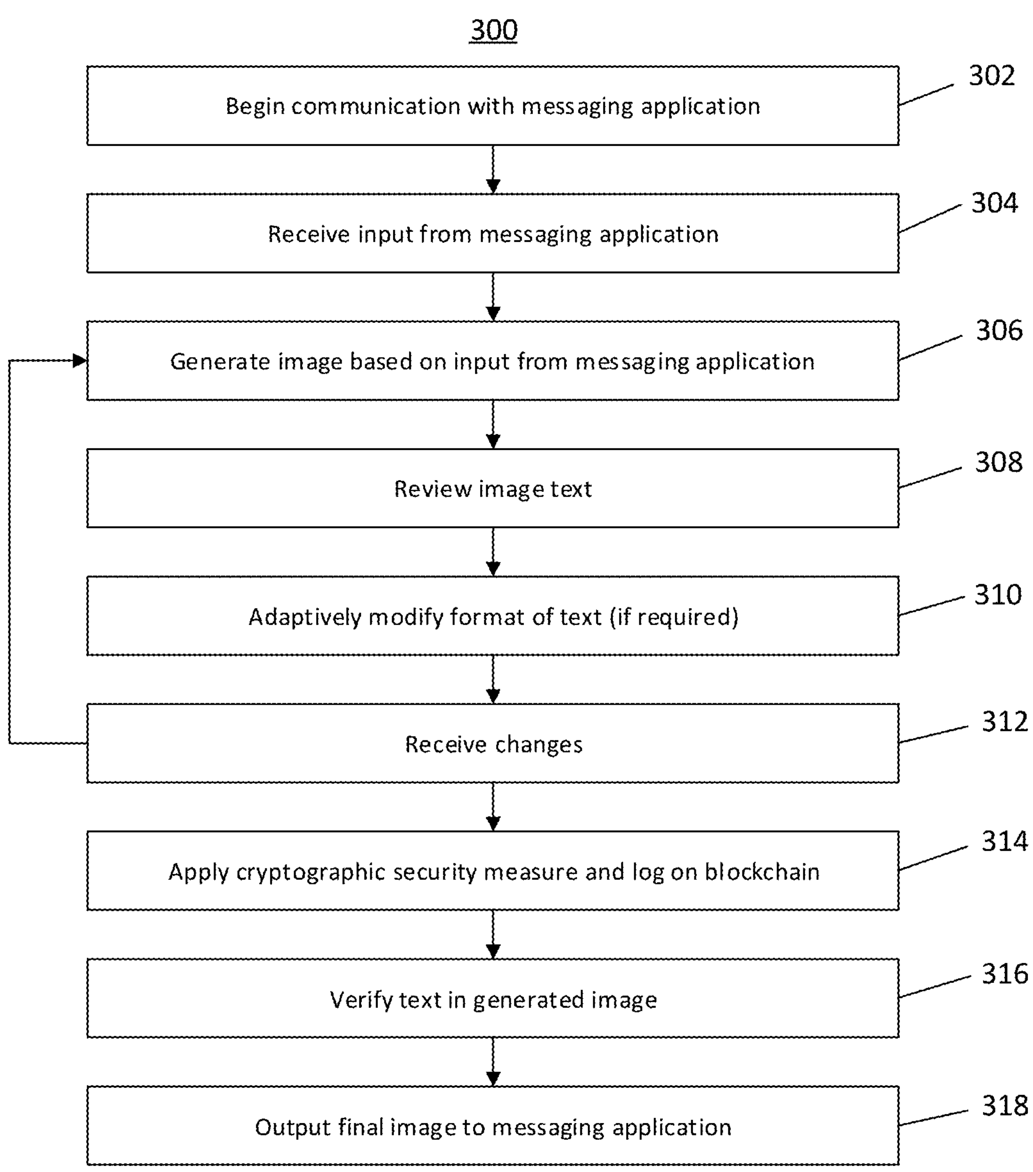
FIG. 3 is a flowchart illustrating an example method for a messaging application interacting with the modified generic generative AI diffusion model of FIG. 1.

Looking now at FIG. 3, a flowchart illustrating an example series of interactions between the diffusion model and a messaging application is described. In FIG. 3, an image is generated that is relevant to conversational queues taken from the messaging application, and the image that is generated can be used in the place of regular text during the conversation taking place on the messaging application.

At step 302, a communication session begins between the diffusion model and the messaging application. The messaging application may be a native messaging application, an application for a mobile device or computer, a message conversion engine, or any other type of messaging software. In an embodiment, the diffusion model may communicate with the messaging application through an API. In an embodiment, the diffusion model may be integrated within the messaging application such as through a plug-in or an extension. The diffusion model may have a pre-existing connection with the messaging application, or may begin a new communication. In an embodiment, the messaging application may be associated with a profile on the database 102, which may store information about previous interactions and prompts.

In example embodiments of the messaging application, the messaging application is a person-to-person messaging application or a peer-to-peer messaging application. The contrasts to an application-to-person (A2P) messaging application where messages are sent between (to or from) an application or a server and a person.

Figure 4:
FIG. 4 is an example image generated by the modified generic generative AI diffusion model of FIG. 1.

At step 304, the diffusion model receives input from the messaging application, prompting the diffusion model to generate an image based on the text input supplied by the messaging application. In an embodiment, the diffusion model receives input in a standard manner, such as through a directed prompt to the diffusion model by a user through the messaging application. Alternately or in addition, the diffusion model may automatically recognize, based on text input into the messaging application, that the text inputted may be a candidate for substitution by an image. For example, a long text string addressing multiple different points may be too complex or convoluted to be accurately displayed in an image. However, a short comment or question may be accurately reflected by an image containing the text, and may serve to better illustrate the message input into the messaging application, such as in FIG. 4.

In an embodiment, the diffusion model may be configured to connect with the messaging app in real time, allowing the diffusion model model to read the text inputs into the messaging application in real time as they are being typed, and suggest images that are automatically generated based on the text input.

At step 306, the diffusion model generates an image based on the text input into the messaging application. In an embodiment, the generated image is based on a direct prompt into the messaging application, such as "Generate an image asking someone if they are free to speak later". In this case, the diffusion model may generate the image and output the image to the messaging application. Alternately, the diffusion model may automatically detect that the text input into the messaging application is suitable, such as from a text input saying, for example "Free to speak later?", and automatically generate an image, such as FIG. 4. In an embodiment, the diffusion model may generate images based on preferences and previous guidelines associated with a profile stored in database 102. For example, if it was previously specified that generated images should not contain predominantly red, the diffusion model may generate an image that contains little to no red. Further preferences may include preferences for image styles, such as cartoonish, realistic, artistic, etc. These preferences or previous guidelines may be kept during current communication sessions, or may be stored in a profile to be accessed at any time. Alternately, the diffusion model may use contextual clues to generate a relevant image. For example, if the input text from the messaging application displays a sense of urgency, such as "Can we talk ASAP?", the diffusion model may generate an image that similarly displays a sense of urgency.

At this stage, the diffusion model may employ an automated review of text to correct any misspellings or generated text that does not match the input text. Generally, diffusion models are primarily trained to generate visual features, such as shapes, colors, and objects, rather than text. Accordingly, these models do not necessarily understand the structure and rules of language as a text generation model might. As such, diffusion models may attempt to mimic text, but struggle to accurately recreate text or a proper sentence, as they may not understand the semantic meaning of the text within the context of the image. Diffusion models may often output random characters or lines that may look like text, but do not actually represent a letter or have any coherent meaning. Further, as many diffusion models do not understand fonts or text styling, the letters in a generated image may be inconsistent and unevenly spaced.

To combat this, at step 308, the diffusion model may analyze the text embedded within the generated image using pattern recognition algorithms, and comparing the analyzed text with the text input that the image is based off of. If the text in the image matches the input text, then the diffusion model may finalize the image. If the text in the image does not match the input text, then the diffusion model may recreate the entire image or the text portion of the image to accurately reflect the input text. In an embodiment, the diffusion model may incorporate a spell checker to generate an image free of typographical errors, even when the original input text message includes typographical errors. Alternately or in addition, the text generated by the diffusion model may include appropriate punctuation, even where not provided in the input text message.

Figure 6:
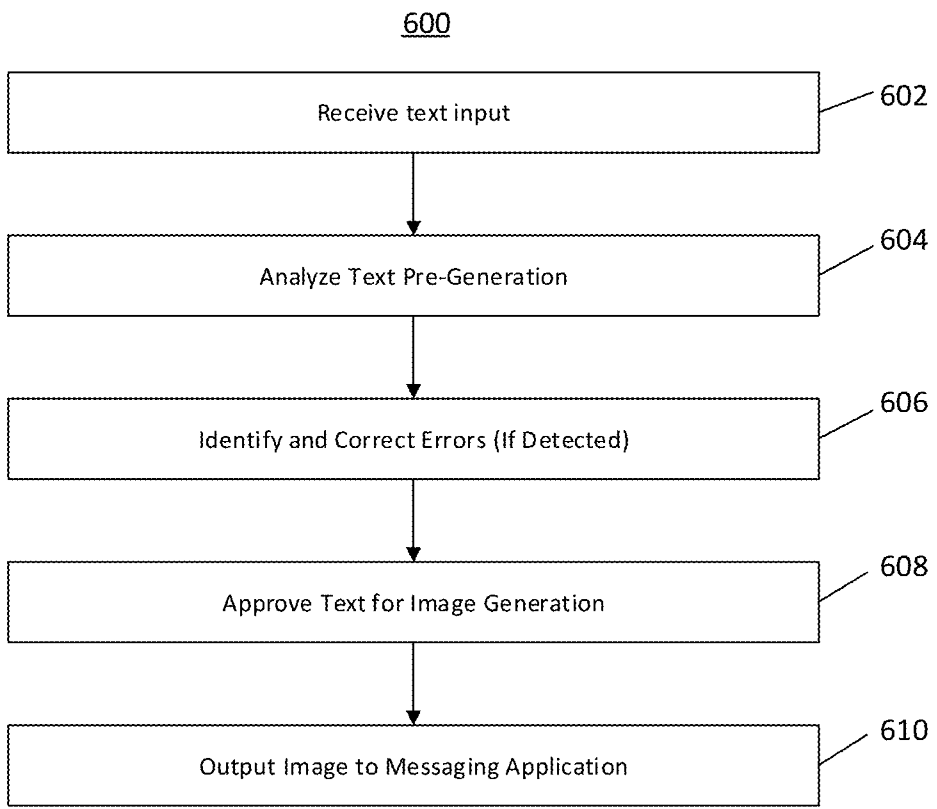
FIG. 6 is a schematic diagram of an AI verification workflow showing the interaction between a primary generative AI model and a secondary AI validation model for ensuring text accuracy and consistency in generated images.
Figure 9:
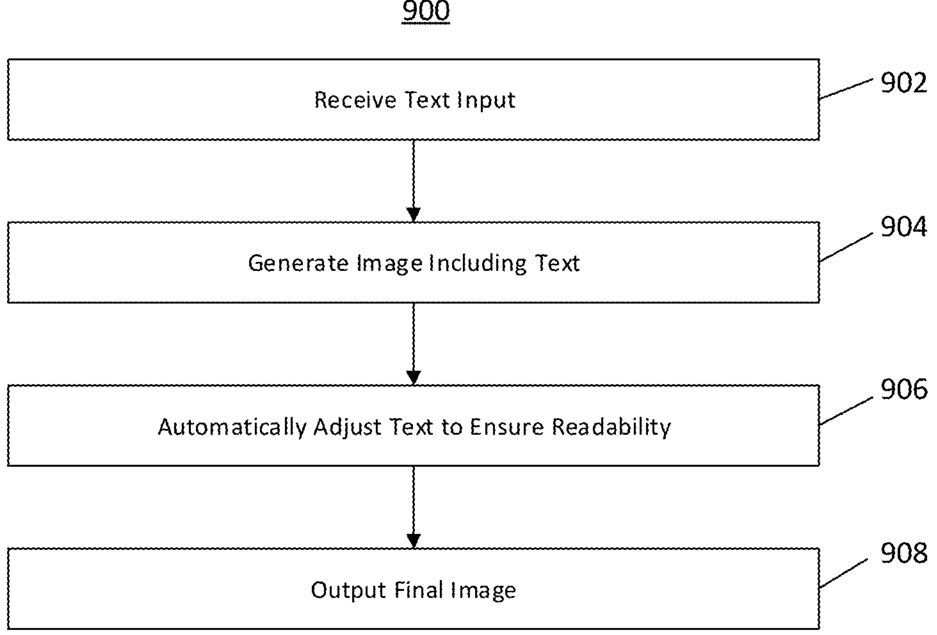
FIG. 9 is a schematic diagram illustrating an AI-driven text formatting workflow, whereby text readability issues and positioning are dynamically corrected before finalizing the AI-generated image.

At step 310, if required based on the review of the text, the diffusion model may further adaptively modify the formatting and positioning of the text, as is discussed further in reference to FIGS. 6 and 9.

At step 312, the diffusion model may receive changes to the image based on feedback, such as changing the content of the image, the background, colour scheme, text positioning, or remaking an image from scratch. In an embodiment, using the text review functionality, changes may be made to aspects of the text that are not typically editable, such as sizing, font, styling, spacing, and any other changes that are deemed necessary.

Figure 8:
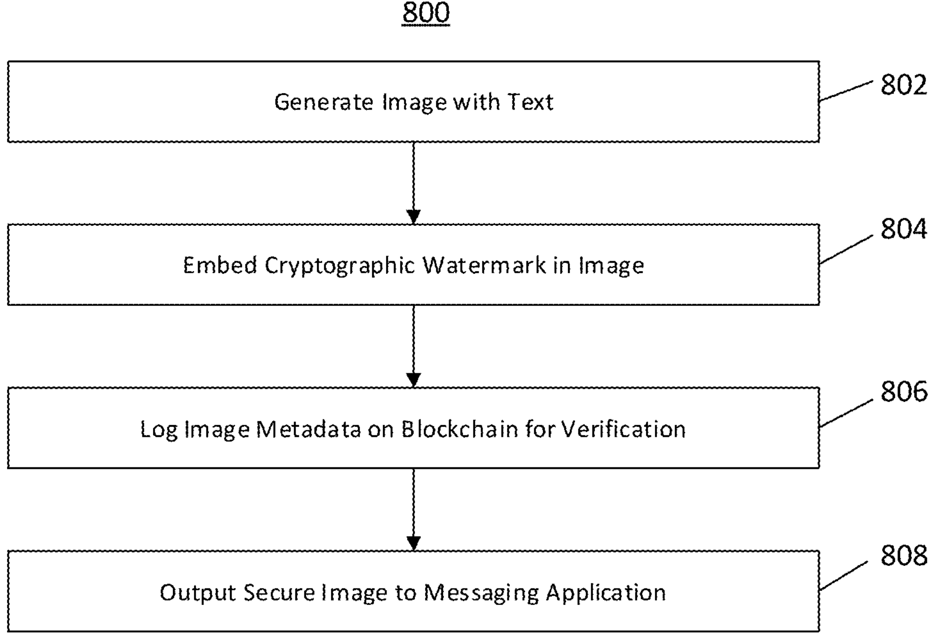
FIG. 8 is a diagram showing cryptographic watermarking and blockchain verification, illustrating how a generated image is secured and stored on a blockchain ledger to prevent tampering and ensure authenticity.

At step 314, the diffusion model may apply security measures and log the generated image on the blockchain, as will be further discussed in reference to FIG. 8.

At step 316, the diffusion model may verify the text in the generated image through a fraud detection model to compare against known phishing patterns as will be discussed further in reference to FIG. 7.

At step 318, after all changes have been made, the diffusion model may output the final image to the messaging application, viewable via the electronic device 108. In an embodiment, the diffusion model may send the final image directly through the messaging application to a second electronic device 108 equipped with the messaging application.

Figure 5:
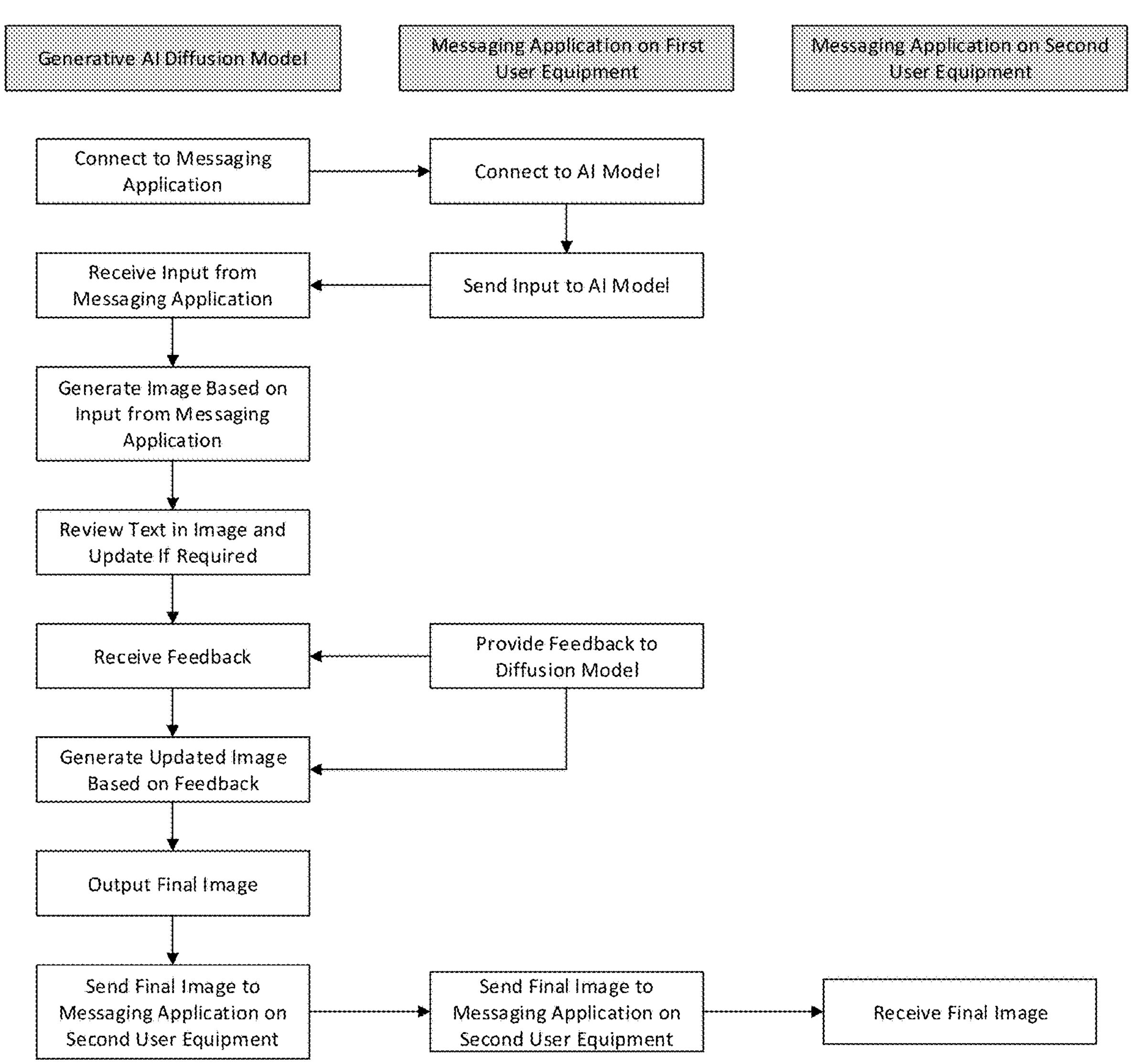
FIG. 5 is a flowchart illustrating communications between the generic generative AI diffusion model of FIG. 1, a messaging application on a first user equipment, and a messaging application on a second user equipment.

Referring now to FIG. 5, an interaction between the generative AI diffusion model, a messaging application on a first user equipment, and a messaging application on a second user equipment is illustrated. As shown, at a first stage, the diffusion model and the messaging application connect and establish a method of communication. As described previously, the diffusion model may be connected to, or integrated with the messaging application. An input is received by the diffusion model via the messaging application, which may be a direct prompt input, or may be automatically determined by the diffusion model as previously described. Based on the text input from the messaging application, the diffusion model generates an image. As previously described, the text in the image may be reviewed, and updated to ensure accuracy and quality if necessary. Following the text correction, feedback may be provided to the diffusion model to update, change, or recreate the generated image. The diffusion model may then generate an updated image, which may be further refined through multiple feedback sessions. Once the image is finalized, it is output to the messaging application on the first user equipment, and can then be sent directly to a similar or different messaging application on a second user equipment. In an embodiment, the generated image can also be saved by the first user equipment for later reference.

In an embodiment, the messaging application on the second user equipment may be in similar communication or integration with the same or a different generative AI diffusion model, which may be configured to receive the generated image from the messaging application on the first user equipment, and send an appropriate generated image in response. Although a messaging application on a first and second user equipment are illustrated in FIG. 5, a person of skill in the art understands that a similar process may occur between an generative AI diffusion model and any number of messaging applications on any number of user equipment. Alternately or in addition, as described above, more than one diffusion model may be present in the process, and may interact with other diffusion models and/or any messaging applications on any user equipment.

FIG. 6 illustrates a system whereby the diffusion model will check the text to correct text inconsistencies, hallucinations, and formatting issues before generating an image. At step 602, the diffusion model receives a text input. At step 604, the diffusion model may cross-check the generated text against the original input to detect any hallucinations or inconsistencies in the text. At step 606, the diffusion model will automatically identify and correct any detected errors, through a secondary AI validation model, performing real-time integrity verification before the diffusion model generates the image. This validation model ensures that text is accurate and contextually relevant before creating the final image. This also adds a layer of approval, ensuring only valid text is embedded into images, and that generated text is legible and properly formatted. Once the text is approved for image generation, the diffusion model may generate the image and output the generated image at step 608, using the approved and analyzed text. In an embodiment, the validation and correction may include real-time text formatting to adjust font size, spacing, and layout based on context. The model may further include adaptive rendering for accessibility, which may improve legibility for users with visual impairments. The model may further ensure that text remains consistent and legible, even where the generated image undergoes compression or resizing.

Figure 7:
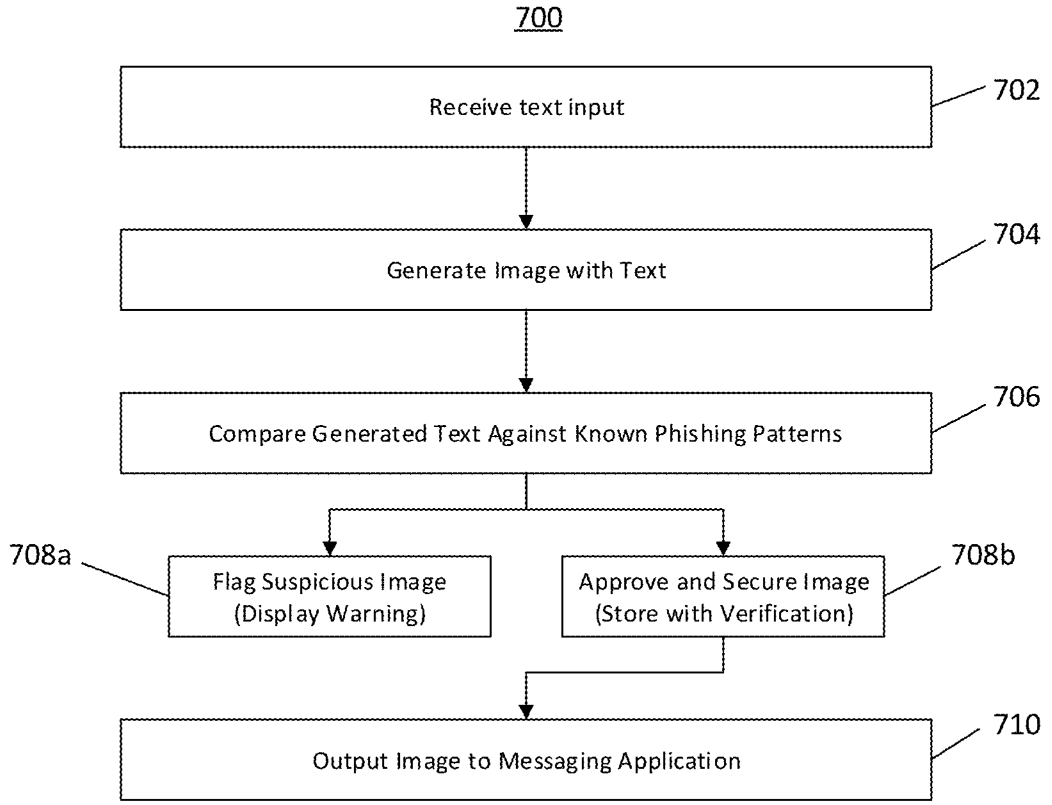
FIG. 7 is a flowchart illustrating fraud detection and prevention in AI-generated images, showing how an AI fraud detection model cross-references generated text against a trusted database of known phishing templates.

FIG. 7 illustrates a multi-layer fraud prevention system, ensuring that phishing or scam-based AI-generated images including text are blocked before they are output to the user or messaging application. At step 702, the diffusion model receives the text input, and generates an image with the text input at step 704. Before outputting the generated image, the diffusion model may compare the generated text or image against known phishing patterns, such as fake invoices, financial scams, or false government notices, to detect deceptive messaging at step 706. The diffusion model may further analyze the generated text within the image for any apparent manipulation, unauthorized content, or inconsistencies. At step 708*a*, if the diffusion model detects any fraudulent or scam content, or unauthorized modifications, the diffusion model may flag the image, prevent output, issue the user a warning, or any combination thereof. In an embodiment, the diffusion model may automatically correct any images containing misleading, deceptive, or unauthorized text patterns. The security checks may operate in real-time, preventing unauthorized modifications before transmission of the generated image. At step 708*b*, if no harmful content is detected in the generated image, the flowchart moves to step 710, where the generated image is output.

FIG. 8 illustrates a flowchart whereby AI-generated images are secured via cryptographic watermarking and blockchain-based logging. At step 802, the diffusion model generates an image with text, based on a text input. At step 804, the image may be embedded with a unique cryptographic watermark, that can be traced and authenticated. In an embodiment, this cryptographic watermark may be tamper-resistant, to prevent unauthorized editing or malicious changes to the watermark. In an embodiment, the cryptographic watermark may encode metadata directly into the pixels of the image, preventing hallucinations from the diffusion model from corrupting text-based imagery. The watermark may be a dynamic watermark, allowing for verification even in compressed images. The metadata of each image may be further logged on an immutable blockchain leger at step 806, providing timestamp verification to track when the image was generated, and proof of authenticity to ensure that the AI-generated messages can be legally and commercially trusted. At step 808, after the logging and embedding has been completed, the final generated image is output, and can be sent. In an embodiment, upon receipt of the generated image, the receiver may cross-check the cryptographic mark against the blockchain record to confirm that the generated image has not been altered since creation, and that it is being sent by the correct sender. If the generated image is to be used in legal or medical communications, the generated image may automatically include verification hashes to confirm the authenticity of the image. The diffusion model may alert a receiver of the generated image if it detects that the image has been altered after being generated. In an embodiment, the blockchain verification may take place during image generation, transmission, and upon receipt. In an embodiment, if the generated image contains personally identifiable information, the diffusion model may automatically trigger an enhanced security protocol before transmission of the generated image.

FIG. 9 illustrates how the diffusion model may actively modify text elements before completing the image generation process. At step 902, the diffusion model receives text input, and generates the image including the text at step 904. At step 906, which occurs before finalizing the image output, the text is analyzed to detect misalignment, overlap or poor contrast, and elements such as text placement, size, and spacing is modified to ensure readability. In an embodiment, the diffusion model may dynamically scale the font size based on the available space in the image. The diffusion model may further reposition or resize text to avoid overlap with other image elements, or other generated text elements. Finally, at step 908, the final image is output. Notably, the final image is only output after all text formatting corrections have been applied, preventing a user from having to manually make post-processing corrections to the image.

In an embodiment, the system may integrate context-aware formatting techniques to further improve readability, such as contrast detection to ensure text remains legible against complex backgrounds, adaptive font scaling to dynamically resize text based on available image space, and multi-line adjustments to prevent excessive text truncation while maintaining visual clarity. When determining what elements of the image to change to increase readability, the model may prioritize text readability over other visual elements when conflicts arise in positioning. Further, the diffusion model may prioritize text based on contextual importance, to ensure that key phrases or text remain prominent in the image. In an embodiment, if the diffusion model detects poor contrast between text and background, it may adjust the placement, color, or both of the text to improve visibility. Further, the diffusion model may prevent text truncation by adjusting line breaks or word wrapping before finalizing the generated image. The diffusion model may detect and correct distortions in text that are caused by perspective changes in the generated image, and may adjust text positioning for different image resolutions. In an embodiment, the diffusion model may employ predefined readability rules, such as minimum font size thresholds, text alignment constraints, and text spacing ratios.

Figure 10:
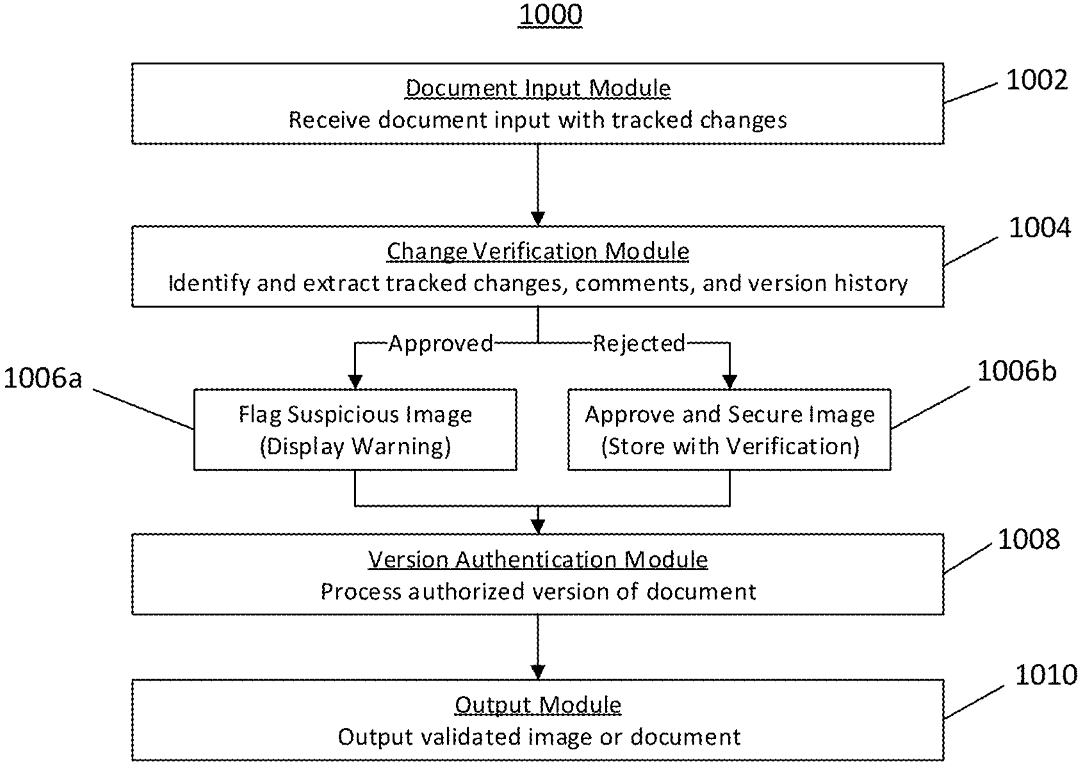
FIG. 10 is a schematic diagram illustrating a document processing system that enables an AI engine to detect and analyze editable document states before applying validation processes.

FIG. 10 illustrates an exemplary system architecture of an AI-based document processing system capable of detecting, interpreting, and validating tracked changes, comments, and version history metadata before applying AI-driven text validation, hallucination detection, or fraud prevention, as illustrated in FIGS. 3-9. At step 1002, a document input module receives an input document containing text with tracked changes, comments, and/or version history metadata. The input document may originate from a word processing application, collaborative editing platform, a document management system. At step 1004, a change verification module extracts tracked changes, comments, and version metadata present in the document. This module may determine whether each tracked change is approved, rejected, or pending. Further, the module may keep a log of tracked changes. Additionally, the module may determine whether the document contains unresolved comments or unapproved modifications. At step 1006, an AI validation module only applies the text validation, fraud detection, and hallucination prevention to the approved text in the document. This ensures that the AI-based review does not include pending or rejected edits. The AI validation module may process tracked changes separately from finalized text when making validation decisions. If the document contains pending or rejected edits, the module may flag the image as suspicious at step 1006*a*. Alternately, if the document does not contain pending or rejected edits, the module may approve the image and note it as secure at step 1006, where it may also be stored with verification. The AI validation module may further log in real-time which edits are included, and which edits are ignored during the validation process. At step 1008, a version authentication module uses cryptographic verification to ensure that only authorized document versions are processed. This prevents the AI from unknowingly analyzing unauthorized or manipulated documents. Finally, at step 1010, the output module generates a validated document or AI assisted response based on the final, approved, unmodified text. If the document contains pending changes as determined at step 1006*a*, the system 1000 may flag the document for further review before proceeding.

Figure 11:
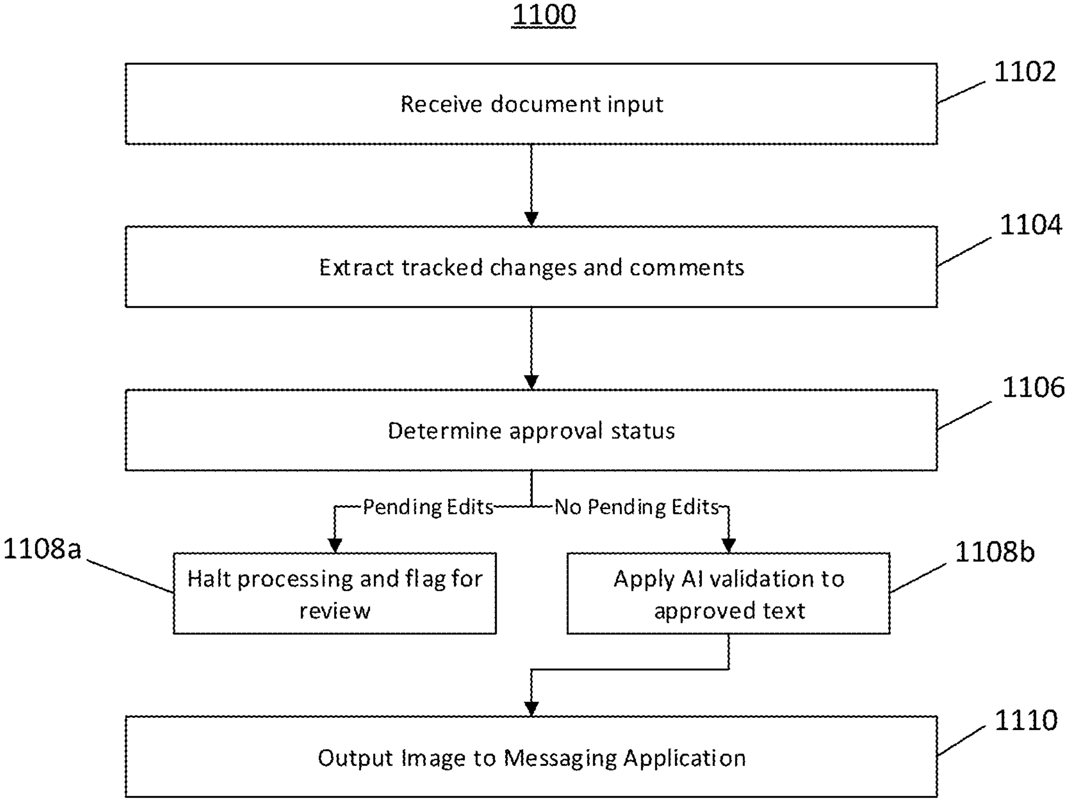
FIG. 11 is a flowchart illustrating a method for processing editable document states, wherein an AI system determines whether tracked changes, comments, or version metadata are approved, rejected, or pending before applying text validation.

FIG. 11 illustrates a step-by-step decision making process 1100 used by a diffusion model to determine how to handle tracked changes, comments, and version history in a document before applying AI-based validation, fraud detection, or hallucination correction. At step 1102, the model receives document input that contains tracked changes, comments, or version history metadata. At step 1104, the system identifies and extracts all tracked edits, comments, and version metadata from the document. At step 1106, the AI system determines whether each individual tracked change is approved, rejected, or pending. In an embodiment, the system may make these determinations based on document metadata, and/or user-defined rules. In an embodiment, the AI system may dynamically adapt the validation method based on user behavior. For example, if a user frequently accepts edits of a certain type, and rejects edits of a different type, the AI may learn that edits of one type are generally more trustworthy, and edits of a different type are generally less trustworthy. At step 1108*a*, if there are pending edits, the system halts processing of the document and flags the document for further user review. Alternately, at step 1108*b*, if there are no pending edits, the AI system applies AI validation including text verification, fraud detection, and hallucination correction to the text. Notably, the system only applies the verification and validation steps to approved text, while excluding rejected or pending edits. Finally, at step 1110, the system generates a final validated version of the document or an AI-assisted response, ensuring that no unapproved changes are included.

This optimized text placement system minimizes the additional GPU computation usage by dynamically adjusting the text without needing to regenerate the full image every time a change is made. Further, the system applies text adjustments in real-time, ensuring minimal processing overhead while maintaining high-quality, legible outputs.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover all suitable changes in technology.

Certain adaptations and modifications of the described embodiments can be made. Therefore, the above discussed embodiments are considered to be illustrative and not restrictive. The embodiments described herein are presented as examples and are not intended to be limiting. Various modifications, adaptations, and alternative configurations may be implemented without departing from the scope of the invention. The described techniques and components may be substituted, combined, or enhanced in ways that achieve similar objectives, and all such variations fall within the intended scope of the claims.

This specification also includes the subject matter of the following clause sets:

Clause Set A

1. A method for generating an AI-generated image with dynamically adjusted text, the method comprising:
   receiving a user input comprising a text prompt for image generation;
   generating an image using an AI model, wherein the image includes text derived from the user input;
   dynamically modifying text positioning before finalizing the image to optimize readability; and
   outputting the finalized AI-generated image.

2. The method of clause 1, wherein the AI model dynamically scales the font size based on available space in the image to maintain readability.

3. The method of clause 1, wherein the AI model repositions text to avoid overlap with other image elements.

4. The method of clause 1, wherein the AI model detects poor contrast between text and background and adjusts placement or color to improve visibility.

5. The method of clause 1, wherein the AI system prevents text truncation by adjusting line breaks or word wrapping before finalizing the image.

6. The method of clause 1, wherein the AI model detects and corrects distortions in text caused by perspective changes in the generated image.

7. The method of clause 1, wherein the AI system ensures text remains legible by analyzing and adjusting positioning for different image resolutions.

8. The method of clause 1, wherein the AI model applies predefined readability rules, including minimum font size thresholds, alignment constraints, and text spacing ratios.

9. The method of clause 1, wherein the AI model prioritizes text readability over other visual elements when conflicts arise in layout positioning.

10. The method of clause 1, wherein the AI model optimizes text positioning based on contextual importance, ensuring key phrases remain visually prominent.

Clause Set B

1. A system for processing editable text in an artificial intelligence (AI)-assisted document processing system, the system comprising:
   a document input module, configured to receive an input document containing tracked changes, comments, or version metadata;
   a change verification module, configured to:
      extract tracked changes, comments, and version metadata from the input document; and
      identify whether each tracked change is approved, rejected, or pending;
   an AI validation module, configured to:
      analyze the document text and apply AI-driven validation, fraud detection, and hallucination correction based on approval status; and
   an output module, configured to generate and output a validated document or AI-generated response based on the processing results.

2. The system of clause 1, wherein the AI validation module is configured to prevent processing of a document if one or more pending modifications are detected.

3. The system of clause 1, wherein the AI validation module is configured to interface with a document collaboration platform to process changes in real time.

4. The system of clause 1, wherein the AI validation module applies cryptographic verification techniques to ensure processing is performed on an authenticated document version.

5. The system of clause 1, wherein the AI validation module is configured to identify and differentiate between multiple users' tracked changes.

6. The system of clause 1, wherein the AI validation module modifies its analysis based on approval metadata, allowing different AI validation techniques for approved, rejected, or pending changes.

7. The system of clause 1, wherein the AI validation module is configured to generate a record of validation operations, including which changes were considered during processing.

8. The system of clause 1, wherein the system is configured to log and categorize user-tracked changes separately from finalized text before applying AI validation.

9. The system of clause 1, wherein the system applies different AI-based validation techniques depending on whether the text originates from a user edit, an AI-generated suggestion, or an external data source.

Clause Set C

1. A method for processing editable text in an artificial intelligence (AI)-assisted document system, the method comprising:
 - receiving, by a processor, an input document containing tracked changes, comments, or version metadata;
 - extracting, by the processor, tracked changes, comments, and version metadata from the input document;
 - identifying, by the processor, whether each tracked change is approved, rejected, or pending;
 - determining, by the processor, whether pending edits exist;
 - if pending edits are detected, modifying processing based on approval status;
 - if no pending edits are detected, applying AI-driven validation, fraud detection, and hallucination correction; and
 - generating and outputting a processed document or AI-generated response.

2. The method of clause 1, wherein the AI system is configured to suspend processing of the document when pending modifications are detected.

3. The method of clause 1, wherein the AI system is configured to interface with a document collaboration platform to track real-time changes.

4. The method of clause 1, wherein the AI system is configured to authenticate document versions before applying validation techniques.

5. The method of clause 1, wherein the AI system applies different AI validation techniques based on approval metadata.

6. The method of clause 1, wherein the AI system records processing decisions, including which document portions were validated.

7. The method of clause 1, wherein the AI system is configured to flag discrepancies between pending changes and final approved versions before outputting results.

8. The method of clause 1, wherein the method includes dynamically adjusting AI fraud detection techniques based on document type, and wherein the AI may flag inconsistencies based on document-specific standards.

9. The method of clause 8, wherein the document types are legal contracts, financial reports, and medical records.

10. The method of clause 1, wherein the method allows for user-defined validation thresholds before flagging or rejecting pending changes, enabling adaptive AI-driven fraud detection.

Clause Set D

1. A system for automating artificial intelligence (AI)-generated image corrections, the system comprising:
 - a processing module, configured to analyze AI-generated images containing text;
 - a validation module, configured to identify and correct text positioning errors, formatting inconsistencies, and hallucinations that would otherwise require manual intervention;
 - an automation module, configured to dynamically replace manual adjustments by automatically applying AI-driven corrections to improve text alignment, readability, and integrity; and
 - a decision module, configured to verify whether a correction is required and implement necessary adjustments in real-time before finalizing the AI-generated image or output.

2. The system of clause 1, wherein the AI system dynamically adjusts font size, spacing, contrast, and placement to enhance text readability without manual input.

3. The system of clause 1, wherein the AI system compares the generated image text to its original input and automatically reprocesses the image if discrepancies are detected.

4. The system of clause 1, wherein the AI system prevents hallucinated, distorted, or unreadable text by applying pre-output text validation before finalizing the image.

5. The system of clause 1, wherein the AI system automatically flags AI-generated images that fail validation criteria and initiates a correction process.

What is claimed is:

1. A method for communication, the method comprising:
 - receiving, by a processor, one or more first manual inputs into a generative Artificial Intelligence (GenAI) model from a messaging application;
 - analyzing, by the GenAI model, the one or more first manual inputs to determine if the one or more first manual inputs contain information that can be accurately conveyed using an image;
 - on a determination that the one or more first manual inputs contain information that can be accurately conveyed using an image, generating an image that conveys the information, wherein the generated image conveys the information using text present in the image;
 - analyzing the text within the generated image to determine the text content;
 - comparing the text content from the generated image to the one or more first manual inputs; if the text content in the generated image does not match the one or more first manual inputs, updating the text in the image to match the one or more first manual inputs; and
 - outputting the image to the messaging application.

2. The method of claim 1, wherein the GenAI model is a generic GenAI model.

3. The method of claim 2, wherein the GenAI model is a diffusion model.

4. The method of claim 3, wherein the one or more first manual inputs are associated with a first profile.

5. The method of claim 4, wherein the one or more first manual inputs and the first profile are associated with a first user equipment.

6. The method of claim 3, wherein the one or more first manual inputs are associated with a first user equipment.

7. The method of claim 1, further comprising sending the image via the messaging application associated with a first user equipment to a messaging application associated with a second user equipment.

8. The method of claim 1, wherein the determination of whether the one or more first manual inputs contain information that can be accurately conveyed using an image is done in real time as the one or more first manual inputs are being entered into the messaging application.

9. The method of claim 1, wherein generating the image further comprises:
 - determining the sentiment of the one or more first manual inputs; and based on the determined sentiment, matching the sentiment of the generated image.

10. The method of claim 9, further comprising:

after the image is generated, receiving, by the processor, one or more second manual inputs from the messaging application; and updating the generated image based on the one or more second manual inputs.

11. The method of claim 10, wherein updating the generated image comprises updating one or more stylistic elements of the text provided in the generated image.

12. The method of claim 11, wherein the stylistic elements of the text provided in the generated image include sizing, font, styling, and spacing.

13. The method of claim 12, further comprising matching the stylistic elements of the text provided in the generated image to the sentiment of the one or more first manual inputs.

14. The method of claim 1, further comprising:

determining whether the one or more first manual inputs contain one or more typographical errors; and based on the determination that the one or more first manual inputs contain one or more typographical errors, correcting the typographical errors in the text generated in the image.

15. The method of claim 1, further comprising:

determining whether the one or more first manual inputs are missing one or more punctuation marks; and based on the determination that the one or more first manual inputs are missing one or more punctuation marks, adding the missing punctuation marks in the text generated in the image.

16. The method of claim 1, wherein the messaging application is a peer-to-peer messaging application or a person-to-person messaging application.

17. The method of claim 1, wherein the GenAI system is integrated into the messaging application.

18. The method of claim 1, wherein generating the image further comprises:

dynamically modifying a positioning of the text before finalizing the generated image to optimize readability.

19. A method comprising:

receiving one or more first manual inputs;

generating an image using an AI model, wherein the generated image conveys the information using text present in the image, and wherein generating the image comprises:

determining the sentiment of the one or more first manual inputs; and based on the determined sentiment, matching the sentiment of the generated image;

receiving, after the image is generated, one or more second manual inputs from the messaging application; and updating the generated image based on the one or more second manual inputs, wherein the updating the generated image comprises:

updating one or more stylistic elements of the text provided in the generated image, wherein the stylistic elements of the text provided in the generated image include sizing, font, styling, and spacing, and matching the stylistic elements of the text provided in the generated image to the sentiment of the one or more first manual inputs.

20. The method of claim 19, wherein the generating the image further comprises:

dynamically modifying a positioning of the text before finalizing the generated image to optimize readability.

* * * * *